US012372207B2

(12) United States Patent
André et al.

(10) Patent No.: US 12,372,207 B2
(45) Date of Patent: Jul. 29, 2025

(54) MARINE VESSEL COMPRISING LG HANDLING SYSTEM

(71) Applicant: Kellogg Brown & Root LLC, Houston, TX (US)

(72) Inventors: David André, Gothenburg (SE); Emma Joelsson, Gothenburg (SE)

(73) Assignee: KELLOGG BROWN & ROOT LLC, Houston, TX (US)

( * ) Notice: Subject to any disclaimer, the term of this patent is extended or adjusted under 35 U.S.C. 154(b) by 0 days.

(21) Appl. No.: 15/579,168

(22) PCT Filed: Jun. 5, 2015

(86) PCT No.: PCT/EP2015/062565
§ 371 (c)(1),
(2) Date: Dec. 1, 2017

(87) PCT Pub. No.: WO2016/192808
PCT Pub. Date: Dec. 8, 2016

(65) Prior Publication Data
US 2018/0135808 A1 May 17, 2018

(51) Int. Cl.
*F17C 13/12* (2006.01)
*B63B 1/10* (2006.01)
(Continued)

(52) U.S. Cl.
CPC ............ *F17C 13/126* (2013.01); *B63B 1/107* (2013.01); *B63B 25/16* (2013.01); *F17C 1/002* (2013.01);
(Continued)

(58) Field of Classification Search
CPC ......... B63B 25/00; B63B 25/16; F17C 1/002; F17C 9/00; F17C 13/126;
(Continued)

(56) References Cited

U.S. PATENT DOCUMENTS 3,453,836 A * 7/1969 Kerr ...................... F17C 13/026 62/53.2
8,091,494 B2 * 1/2012 Nikolajsen .............. B63B 25/16 114/74 A
(Continued)

FOREIGN PATENT DOCUMENTS

AU 2015397168 A1 12/2016
AU 2020207859 A1 7/2020
(Continued)

OTHER PUBLICATIONS

Australian Government—IP Australia, Examination Report No. 1 for Standard Patent Application No. 2015397168 dated Jul. 23, 2019 (3 pages).
(Continued)

*Primary Examiner* — Lars A Olson
(74) *Attorney, Agent, or Firm* — Gary M. Machetta

(57) ABSTRACT

A marine vessel is provided comprising a liquefied gas (LG) handling system. The LG handling system comprises an LG tank which is installed on a portion of the marine vessel. The LG handling system comprises a vent line system which is connected to the LG tank and which has an outlet arranged on a elevated structure on the marine vessel at a vertical distance from the portion of the marine vessel on which the LG tank is installed. Optionally or additionally, the outlet may be arranged on an elevated structure on the marine vessel at a vertical distance from the deck or a working area below the outlet.

10 Claims, 1 Drawing Sheet

(51) Int. Cl.

| | |
|---|---|
| ***B63B 25/16*** | (2006.01) |
| ***F17C 1/00*** | (2006.01) |
| ***F17C 9/00*** | (2006.01) |

(52) U.S. Cl.

CPC ........ *F17C 9/00* (2013.01); *F17C 2205/0176* (2013.01); *F17C 2205/0332* (2013.01); *F17C 2221/033* (2013.01); *F17C 2221/035* (2013.01); *F17C 2223/0161* (2013.01); *F17C 2223/033* (2013.01); *F17C 2260/021* (2013.01); *F17C 2260/042* (2013.01); *F17C 2270/0105* (2013.01)

(58) Field of Classification Search

CPC ...... F17C 2205/0176; F17C 2205/0332; F17C 2221/033; F17C 2221/035; F17C 2223/033; F17C 2270/0105; F17C 1/00

USPC .......................................................... 114/74 R

See application file for complete search history.

(56) References Cited

U.S. PATENT DOCUMENTS

| | | | | |
|---|---|---|---|---|
| 9,039,332 | B2 | 5/2015 | Moon et al. | |
| 2009/0266086 | A1* | 10/2009 | Lee | F17C 9/02 62/48.1 |

FOREIGN PATENT DOCUMENTS

| | | | | |
|---|---|---|---|---|
| AU | 2022231698 | A1 | 9/2022 | |
| CN | 204264418 | U | 4/2015 | |
| EP | 2228294 | A1 * | 9/2010 | B63B 25/16 |
| KR | 20140106825 | A | 9/2014 | |
| KR | 20140148144 | A | 12/2014 | |
| KR | 20150047320 | A | 5/2015 | |

OTHER PUBLICATIONS

Australian Government—IP Australia, Examination Report No. 2 for Standard Patent Application No. 2015397168 dated Nov. 13, 2019 (3 pages).

Australian Government—IP Australia, Examination Report No. 3 for Standard Patent Application No. 2015397168 dated Jun. 26, 2020 (8 pages).

Australian Government—IP Australia, Examination Report No. 1 for Standard Patent Application No. 2022231698 dated Jan. 6, 2024 (6 pages).

* cited by examiner

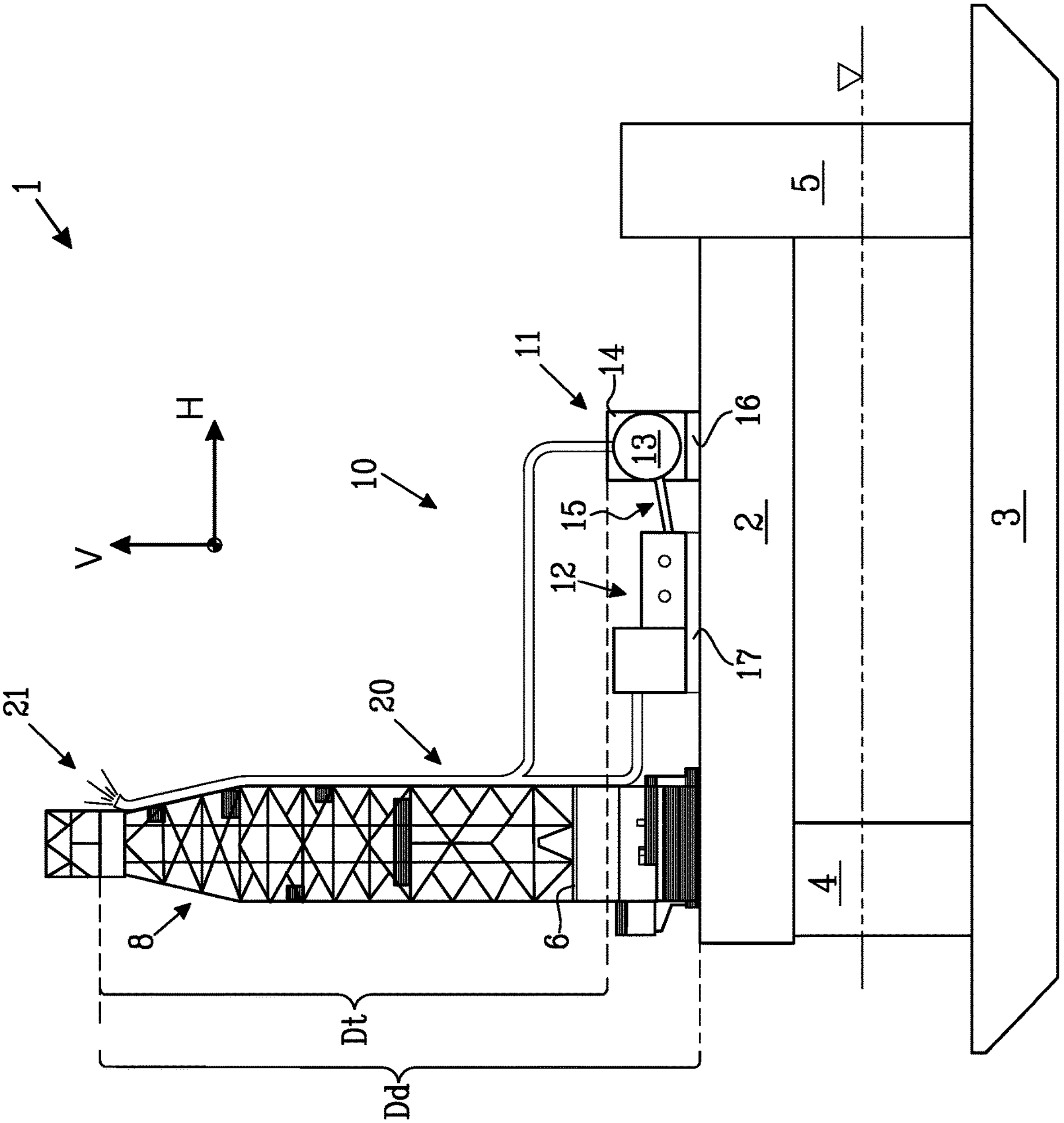
1
10
11
12
13
14
15
16
17
2
3
4
5
6
8
20
21
H
V
Dt
Dd

MARINE VESSEL COMPRISING LG HANDLING SYSTEM

TECHNICAL FIELD

The invention pertains to a marine vessel comprising an LG handling system such as a LNG handling system, said LG handling system comprising an LG fuel tank which is installed on a portion of said marine vessel, said LG handling system comprising a vent line system.

BACKGROUND

Liquefied natural gas, LNG, is produced by cooling natural gas and purifying it to a desired methane content, such as 95% or more. Liquefaction is achieved by cooling the purified natural gas to a temperature of −162° C. or below. When transporting, storing and using LNG as a fuel, the cryogenic temperature associated with LNG systems gives rise to safety considerations. Although LNG is kept in generally non-pressurized, highly insulated tanks, the great temperature differential between the interior of the tank and the ambient air causes the temperature in the tank to rise over time, resulting in fuel evaporation and pressure build-up inside the tank. LNG escaping from an LNG system and mixing with air in a confined space may under certain conditions be an explosion hazard or may cause asphyxiation. A further hazard is that people and equipment may be injured by exposure to the extremely cold cryogenic substance. For these reasons, handling of LNG is subject to extensive safety regulations including requirements for good ventilation and safety zones surrounding LNG equipment.

It is an object of the invention to provide a marine vessel having an improved LNG handling system, in particular with regard to the ventilation arrangement of the LNG handling system.

SUMMARY

According to the invention, there is offered a marine vessel comprising an LG handling system, in accordance with claim 1. Further embodiments are set out in the dependent claims.

As disclosed herein, there is provided a marine vessel comprising an LG handling system. The LG handling system comprises an LG tank which is installed on a portion of the marine vessel. The LG handling system comprises a vent line system which is connected to the LG tank and which has an outlet arranged on an elevated structure on the marine vessel at a vertical distance from the portion of the marine vessel on which the LG tank is installed. Optionally or additionally, the outlet may be arranged on an elevated structure on the marine vessel at a vertical distance from the deck or a working area below the outlet. When referring to the working area, it is preferably the closest working area below the outlet.

The liquefied gas, LG, may be liquefied hydro carbon gas, such as liquefied natural gas also referred to as LNG, liquefied propane/butane gas also referred to as LPG and/or liquefied ethylene gas also referred to as LEG. It is preferable that the LG handling system is a LNG handling system and the LG tank is a LNG tank. Hereafter reference is made to an LNG handling system but the described features may equally be adoptable on a LG handling system or the like. LNG—Liquefied Natural Gas is natural gas that has been converted into liquid form by cooling the gas below −162° C. LNG has a high content of methane, $CH_4$, such as 95% or more and takes up approximately 1/600th of the volume of natural gas in the gaseous state. LNG is odourless, colourless, non-toxic and non-corrosive and is kept in thermally insulated non-pressurized tanks. Hazards include flammability after vaporization into a gaseous state, freezing and asphyxia.

A particular hazard when handling cryogenic substances such as LNG is the very low temperature of the substance. In order to avoid personal injuries as well as injuries on temperature sensitive equipment caused by exposure to the cryogenic substance LNG is kept in highly isolated tanks. All personnel must wear protective gear when working in an area where there is a risk of being directly exposed to LNG. Since LNG is stored at atmospheric pressure, and not pressurized from external sources, a leak from an LNG tank or from piping connected to an LNG tank will not cause immediate explosion.

Although LNG vapour mixed with air may explode when ignited under certain conditions, LNG is not extremely flammable and will only burn in air at a content of between 5 percent and 15 percent by volume. At high LNG vapour concentrations, the major risk for personnel is asphyxiation.

As the temperature difference between the inside of an LNG tank and the ambient air is very large, the temperature inside the tank rises over time, causing LNG to evaporate and the pressure in the tank to rise. For this reason, LNG tanks are equipped with pressure relief valves which automatically let out excess LNG vapour when the internal pressure in the tank rises above a predetermined level. The LNG vapour is released to the ambient air via an outlet from a vent line system.

The LG handling system as disclosed herein may comprise more than one LNG tank. Pressure relief valves may be installed for each tank and be connected to the vent line system which may have a common outlet for all pressure relief valves.

According to safety regulations, an outlet from a vent line system from an LNG handling system should be surrounded by a safety zone. Such safety zone may be defined as a zone having a radius of 10 meters.

As set out herein, the safety zone required around an LNG gas outlet is removed from the location of the LNG handling system to a part of the marine vessel which is less crowded with personnel and equipment. Thereby, space on the support structure can be freed for other use. This is particularly advantageous when the support structure is a deck or similar where the available space is very limited. Furthermore, the LNG vapour ventilated from the outlet can quickly dissipate into the ambient air without risk of harming people or equipment.

The elevated structure on which the outlet from the vent line system is placed is preferably a pre-existing structure on the marine vessel such as a crane, a derrick or a flare tower. Hence, the primary function of the elevated structure is not as a part of the LNG handling system.

The outlet from the vent line system is preferably placed in a portion of the elevated structure which is normally not accessible to personnel, and which is removed from populated areas of the vessel. As set out herein, the outlet from the vent line system may be placed at an upper portion of the elevated structure, such as at and end portion of the elevated structure. It may be preferred that the vertical distance from the LNG tank, or the deck or working area below, is at least 6 meters, preferably at least 10 meters, more preferably at least 20 meters. The outlet from the vent line system may be removed from the LNG tank both in a vertical direction and in a horizontal direction.

As disclosed herein, the portion of the marine vessel on which the LNG handling system is placed may be a deck, such as a main deck of the marine vessel. Other portions on which the LNG handling system may be placed may be on a column, deck box or inside the hull.

The marine vessel may be a semi-submersible vessel or a vessel with conventional hull form, i.e. a monohull or a multihull vessel such as a catamaran or a trimaran.

On a semi-submersible vessel, the portion of the vessel on which the LNG fuel tank is installed may be a vertically arranged support column on the semi-submersible vessel.

The marine vessel may be an LNG power-driven vessel. The LNG tank may be an LNG fuel tank and the LNG handling system may consist of or comprise an LNG fuel supply system for supplying LNG fuel to a power system of the marine vessel. It is also possible that the LNG tank is for storage of LNG, e.g. if the LNG handling system is arranged on an FLNG.

The LNG handling system may comprise an LNG storage and gas processing unit and/or an LNG bunkering unit. When the LNG handling system is an LNG fuel supply system, the LNG fuel supply system may comprise an LNG fuel tank for storage of LNG and gas processing equipment for processing of LNG to fuel gas in accordance with engine fuel requirements. All equipment may be fully enclosed and the enclosure may be ventilated. The ventilation system may be a stand-alone ventilation system or may be connected to the ventilation system of the vessel. The enclosure may protect structural steel from cryogenic spillage. The LNG storage tank and gas processing unit may be connected by piping to a bunkering unit for bunkering of LNG. The system may comprise further equipment such as a bunkering control cabin with necessary control systems for bunkering and connections for interfacing with the vessel's monitoring and control systems and safety systems. The control cabin may be a safe area which is equipped with a ventilation system which may be a stand-alone ventilation system or a ventilation system connected to the ventilation system of the vessel.

The LNG storage and gas processing unit and/or the LNG bunkering unit may be provided as modular components of the LNG fuel supply system.

In a module based marine LNG fuel system modules may be lifted and installed on board a vessel when needed. The modular units may be installed on the vessel and connected to each other and to other assembly modules or equipment on the vessel such as a pre-installed vent line system, a power system, etc.

By providing the LNG fuel system in the form of modular components, deck load capacity and deck area of the vessel can be utilized for other purposes when an LNG fuel system is not installed. A vessel may be prepared for installing an LNG fuel system module at a later stage. A LNG fuel system module may be moved between different vessels and may be shared by different vessels if the need to operate on LNG is intermittent. As set out herein, the vessel may be a semi-submersible or a vessel with conventional hull form, i.e. monohull or alternatively a multihull vessel such as a catamaran or a trimaran. The modules are typically intended to be placed on an open deck of the vessel. The modules may be split in sub-modules or combined as found practical.

As mentioned, the LG handling system may be a liquefied hydro carbon gas system, such as a LNG handling system, LPG handling system, LEG handling system. As is understandable, if the LG handling system is a LNG handling system, the LG tank is a LNG tank and a LG gas processing unit, if present, is of course a LNG gas processing unit for processing LNG, and so forth.

The liquefied gas, LG, may be liquefied hydro carbon gas, such as liquefied natural gas also referred to as LNG, liquefied propane/butane gas also referred to as LPG and/or liquefied ethylene gas also referred to as LEG. It is preferable that the LG module is a LNG module.

BRIEF DESCRIPTION OF THE DRAWINGS

The present invention will be further explained hereinafter by means of non-limiting examples and with reference to the appended drawing wherein:

FIG. 1 shows a side view of a semisubmersible vessel with an LNG handling system.

DETAILED DESCRIPTION

It is to be understood that the drawings are schematic and that the parts of the illustrated marine vessel are not shown in detail and not necessarily drawn to scale. The semi-submersible vessel shown in the FIGURE is provided as an example only and should not be considered limiting to the invention. As set out herein, the LNG handling system of the invention may be used on other types of marine vessels of any type such as a vessel of the conventional monohull or multihull type. Furthermore, the invention is applicable to marine vessels used for other purposes than drilling, such as oil and gas exploration, vessels for offshore storage and processing of hydrocarbons, etc. Accordingly, the scope of the invention is determined solely by the appended claims.

The semi-submersible vessel 1 shown in FIG. 1 is an offshore drilling platform with a main deck 2. The side view of the semi-submersible vessel 1 in FIG. 1 shows a pontoon 3 of a lower pontoon structure and two columns 4, 5 which extend vertically upward from the pontoon 3 to the main deck 2. The main deck 2 is arranged for supporting such functions and items as cranes, crew quarters, a heli-pad, lifeboats, racks for horizontally storing drill pipes and riser pipes etc. Such structures and items are not shown in FIG. 1. A drilling deck 6 is arranged above the main deck 2 and supports a derrick 8.

An LNG handling system 10 is installed on the main deck 2. In the example shown in FIG. 1, the LNG handling system 10 is a fuel supply system for supplying regasified natural gas to the power system of the semi-submersible vessel 1. It should be noted that the LNG handling system may be installed on other portions on the marine vessel than on the main deck 2, such as in the hull, in a deck box, in a pontoon, in a column, deck house, or a super structure for example.

The LNG handling system comprises an LNG storage and gas processing 11 unit and an LNG bunkering unit 12.

The LNG storage and gas processing unit comprises an LNG tank 13 for storage of LNG and gas processing equipment 14 for regasifying of LNG to fuel gas in accordance with engine fuel requirements. As set out herein, all equipment may be fully enclosed in a protective barrier structure which is appropriately ventilated. The ventilation system may be a stand-alone ventilation system or may be connected to the ventilation system of the vessel. The enclosure may protect structural steel from cryogenic spillage. The LNG storage tank 13 and the gas processing unit 14 are connected by piping 15 to the bunkering unit 12. The system may comprise further equipment such as a bunkering control cabin with necessary control systems for bunkering and connections for interfacing with the vessel's monitoring and control systems and safety systems. A control cabin may be a safe area which is equipped with a ventilation system which may be a stand-alone ventilation system or a ventilation system connected to the ventilation system of the semi-submersible vessel 1.

The LNG storage and gas processing unit 11 and the LNG bunkering unit 12 shown in FIG. 1 are provided as modular components of the LNG fuel supply system. The LNG storage and gas processing unit 11 is arranged on a first module frame 16 which supports the equipment of the LNG storage and gas processing unit 11 and which is mounted on a matching foundation on the deck 2 of the vessel 1. The LNG bunkering unit 12 is arranged on a second module frame 17 which supports the equipment of the LNG bunkering unit 12 and which is mounted on a matching foundation on the deck 2 of the vessel 1. The provision of the LNG fuel supply system or any LNG handling system in the form of pre-assembled modules is not a prerequisite of the invention. Alternatively, one or more components of the LNG handling system may be permanently installed on the marine vessel.

In a module based marine LNG handling system, such as an LNG fuel system, modules may be lifted and installed on board a vessel when needed. The modular units may be installed on the vessel and connected to each other and to other assembly modules or equipment on the vessel such as a pre-installed vent line system, a power system, etc.

By providing the LNG fuel system in the form of modular components, use of the deck load capacity and the deck area of the vessel can be optimized and deck area can be utilized for other purposes when an LNG fuel system is not installed. A vessel may be prepared for installing an LNG fuel system module at a later stage. A LNG fuel system module may be moved between different vessels and may be shared by different vessels if the need to operate on LNG is intermittent. In addition, the modular system allows the capacity of the LNG fuel system to be increased or decreased as required.

The LNG handling system 10 comprises a vent line system 20, which has an outlet 21 arranged on the derrick 8. The vent line system 20 may be a permanently installed arrangement on the vessel 1 which is arranged for coupling to the LNG handling units 11, 12. The outlet 21 from the vent line system 20 is an outlet for ventilated vaporised gas from the LNG storage and gas processing unit 11 and the LNG bunkering unit 12. The outlet 21 is placed at the top of the derrick 8 at a vertical distance from the deck 2 portion of the vessel 1 where the fuel tank 13 is installed. As the outlet 21 from the vent line system 20 is placed in a portion of the derrick 8 which is normally not accessible to personnel, and which is far removed from the deck 2 ventilated gas can be quickly dissipated into air without any risk of personal injury or damage to temperature sensitive equipment. In addition, the gas exiting the outlet 21 will immediately mix with air and the concentration of natural gas in the air will rapidly sink below 5% implying that a potential risk of ignition of the gas is virtually eliminated. In FIG. 1 the gas outlet 21 is placed at the top of the derrick 8. However, the gas outlet 21 may be placed at any portion of the derrick 8 where it is sufficiently far removed from the main deck 2 and the LNG tank 13. It may be preferred that the vertical distance $D_t$ from the LNG tank and/or the vertical distance $D_d$ from the deck 2, or working area below, is at least 6 meters, preferably at least 10 meters, more preferably at least 20 meters. As is shown in FIG. 1, the outlet from the vent line system may be removed from the LNG tank both in a vertical direction V and in a horizontal direction H.

The invention claimed is:

1. A marine vessel (1) comprising:

a power system;

a modular LG handling system (10) configured to supply a regasified natural gas to the power system, the LG handling system (10) comprising:

an LG storage and gas processing unit (11) on a portion of the marine vessel; and an LG bunkering unit (12); and a vent line system (20) configured to connect to each of said LG storage and gas processing unit (11) and said LG bunkering unit (12), wherein said vent line system (20) has an outlet (21) arranged on an elevated structure on said marine vessel (1) and removed at a vertical distance ($D_d$) from said portion of said marine vessel (1) on which said said LG storage and gas processing unit (11) and said LG bunkering unit (12) are installed.

2. The marine vessel (1) according to claim 1, wherein said elevated structure is a crane, a derrick (8) or a flare tower.

3. The marine vessel (1) according to claim 1, wherein said portion of said marine vessel (1) is a deck (2), a hull, deck house, or a super structure.

4. The marine vessel (1) according to claim 1, wherein said marine vessel (1) is a semi-submersible vessel (1).

5. The marine vessel (1) according to claim 4, wherein said portion of said marine vessel (1) on which said LG tank is installed is a vertically arranged support column (4, 5), pontoon, deck box, deck house, or a super structure on said semi-submersible vessel (1).

6. The marine vessel (1) according to claim 1, wherein said LG storage and gas processing unit (11) comprises at least one of: an LG fuel tank (13) and an LG storage tank.

7. The marine vessel (1) according to claim 1, wherein at least one of said LG storage and gas processing unit (11) and said LG bunkering unit (12) is provided as a modular component.

8. The marine vessel (1) according to claim 7, wherein said vent line system (20) is permanently installed on said marine vessel (1).

9. The marine vessel (1) according to claim 1, wherein said vertical distance is at least 6 meters.

10. The marine vessel (1) according to claim 1, wherein said LG handling system is selected from a group consisting of: a liquefied hydro carbon gas system, a LNG handling system, LPG handling system, and LEG handling system.

* * * * *